United States Patent [19]

Bergfield

[11] Patent Number: 5,189,802

[45] Date of Patent: Mar. 2, 1993

[54] VEHICLE PARKING GUIDE

[76] Inventor: Willis E. Bergfield, 7505 Walnut Canyon Dr., Moorpark, Calif. 93021

[21] Appl. No.: 881,077

[22] Filed: May 11, 1992

[51] Int. Cl.⁵ .............................................. B60Q 9/00
[52] U.S. Cl. ....................................... 33/264; 33/286; 116/28 R; 116/56; 116/205
[58] Field of Search ................. 33/264, 286, 288, 600; 116/28 R, 30, 56, 203, 205

[56] References Cited

U.S. PATENT DOCUMENTS

| | | | |
|---|---|---|---|
| 1,981,188 | 11/1934 | Pavitt | 116/28 R |
| 2,296,311 | 9/1942 | Schneider | 116/28 R |
| 2,454,896 | 11/1948 | Traub | 116/28 R |
| 2,731,934 | 1/1956 | Hausmann et al. | 116/28 R |
| 2,854,942 | 10/1958 | Ross | 116/28 R |
| 3,121,416 | 2/1964 | Gizdich | 116/28 R |
| 3,219,972 | 11/1965 | Williams | 116/28 R |
| 3,261,321 | 7/1966 | Mandl | 116/28 R |
| 3,621,807 | 11/1971 | Kang | 116/28 R |
| 3,664,291 | 5/1972 | Fritz | 116/28 R |
| 3,872,820 | 3/1975 | Hess | 116/28 R |
| 4,036,165 | 7/1977 | Wood | 116/28 R |
| 4,101,868 | 7/1978 | Bubnich et al. | 116/28 R |
| 4,433,636 | 2/1984 | Crouch | 33/264 |
| 4,490,917 | 1/1985 | Pilling | 33/264 |

Primary Examiner—William A. Cuchlinski, Jr.
Assistant Examiner—C. W. Fulton
Attorney, Agent, or Firm—Robert M. Sperry

[57] ABSTRACT

An improved parking guide comprising a free-standing, portable base having a support member projecting vertically upward from the base and carrying a position display board mounted adjacent the upper end of the support member, a pointer rotatably mounted on a pulley mounted on the support member adjacent the position display board and having an indicator arm moveable across at least a portion of the position display board, a spacer arm mounted on the support member adjacent the position display board and projecting frowardly from the support member, and an actuating cord secured to the base and extending upward to the outer end of the spacer arm and then inward and about the pulley in driving relation with the pulley.

15 Claims, 1 Drawing Sheet

VEHICLE PARKING GUIDE

BACKGROUND

1. Field of Invention

This invention relates to automotive vehicles and is particularly directed to improved means for guiding drivers in safely maneuvering automotive vehicle during parking operations and the like.

2. Prior Art

In maneuvering automotive vehicles into parking areas, such as garages, it is often difficult to determine the precise position of the vehicle bumper with respect to an adjacent wall or the like. Consequently, the driver is faced with the alternatives of parking too far from the wall (Which often means that the garage door cannot be closed or that there is insufficient space between the rear of the vehicle and the garage door to allow persons to walk therebetween.) or of ramming the wall (Which may result in damage to the wall, the vehicle or both.). Moreover, storage areas are often located adjacent garage walls, making it necessary to park the vehicle a sufficient distance from the garage wall to prevent crushing articles located within the storage area. Unfortunately, such articles are frequently too low to be observed by the driver as they attempt a parking maneuver. Consequently, it becomes necessary to have an observer, outside the vehicle, to guide the driver in parking the vehicle or the driver must rely upon instinct to tell when they are approximately in the proper parking position. However, observers are not always available and reliance upon instinct can be unreliable.

Numerous prior art devices have been proposed for overcoming these problems. However, many of the prior art parking aids have been complex devices which are expensive to purchase, install and maintain. Other prior art parking aids have been unreliable or ambiguous and, hence, have provided little assistance. Furthermore, many of the prior art parking aid devices require fixed or permanent installation and, hence, are difficult or impossible to reposition, if necessary or desirable. A search in the United States Patent Office has revealed the following:

| U.S. PAT. NO. | INVENTOR | ISSUED |
| --- | --- | --- |
| 4,490,917 | J. T. Pilling | Jan. 1, 1985 |
| 2,854,942 | J. A. Ross | Oct. 7, 1958 |
| 4,036,165 | H. V. Wood | Jul. 19, 1977 |
| 4,101,868 | F. J. Bubnich et al | Jul. 18, 1978 |

However, each of these references is subject to the limitations discussed above. Thus, none of the prior art parking aids have been entirely satisfactory.

BRIEF SUMMARY AND OBJECTS OF INVENTION

These disadvantages of prior art parking aids are overcome with the present invention and an improved parking aid is provided which provide a positive indication to the driver of the vehicle position as it approaches a desired parking position and which does not require an external observer, yet is simple and inexpensive to purchase, install and maintain and which can quickly and easily be repositioned, if necessary or desirable.

The advantages of the present invention are preferably attained by providing an improved parking guide comprising a free-standing, portable base having a support member projecting vertically upward from the base and carrying a position display board mounted adjacent the upper end of the support member, a pointer rotatably mounted on a pulley mounted on the support member adjacent the position display board and having an indicator arm moveable across at least a portion of the position display board, a spacer arm mounted on the support member adjacent the position display board and projecting forwardly from the support member, and an actuating cord secured to the base and extending upward to the outer end of the spacer arm and thence inward and about the pulley in driving relation with the pulley.

Accordingly, it is an project of the present invention to provide an improved parking guide.

Another object of the present invention is to provide an improved parking guide which provides a positive indication to the driver of the vehicle position as it approaches a desired parking position.

A further object of the present invention is to provide an improved parking guide which does not require an external observer.

An additional object of the present invention is to provide an improved parking guide which is simple and inexpensive to purchase, install and maintain.

Another object of the present invention is to provide an improved parking guide which can quickly and easily be repositioned, if necessary or desirable.

A specific object of the present invention is to provide an improved parking guide comprising a free-standing, portable base having a support member projecting vertically upward from the base and carrying a position display board mounted adjacent the upper end of the support member, a pointer rotatably mounted on a pulley mounted on the support member adjacent the position display board and having an indicator arm moveable across at least a portion of the position display board, a spacer arm mounted on the support member adjacent the position display board and projecting forwardly from the support member, and an actuating cord secured to the base and extending upward to the outer end of the spacer arm and thence inward and about the pulley in driving relation with the pulley.

These and other objects and features of the present invention will be apparent from the following detailed description, taken with reference to the figures of the accompanying drawing.

DETAILED DESCRIPTION OF THE INVENTION

Figure 2:
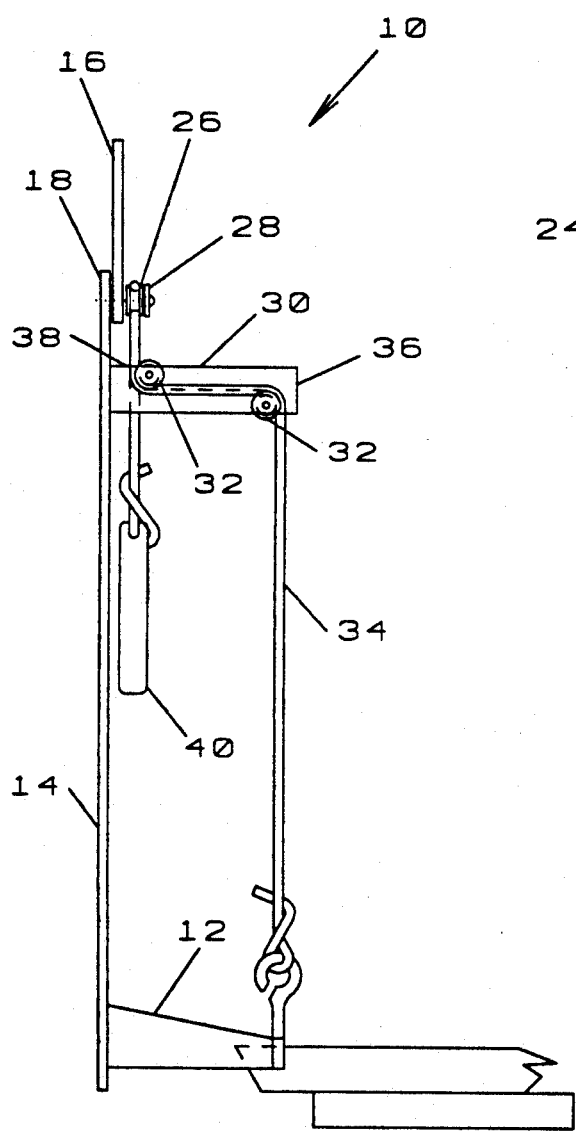
FIG. 2 is a side view of the parking guide of FIG. 1.
Figure 1:
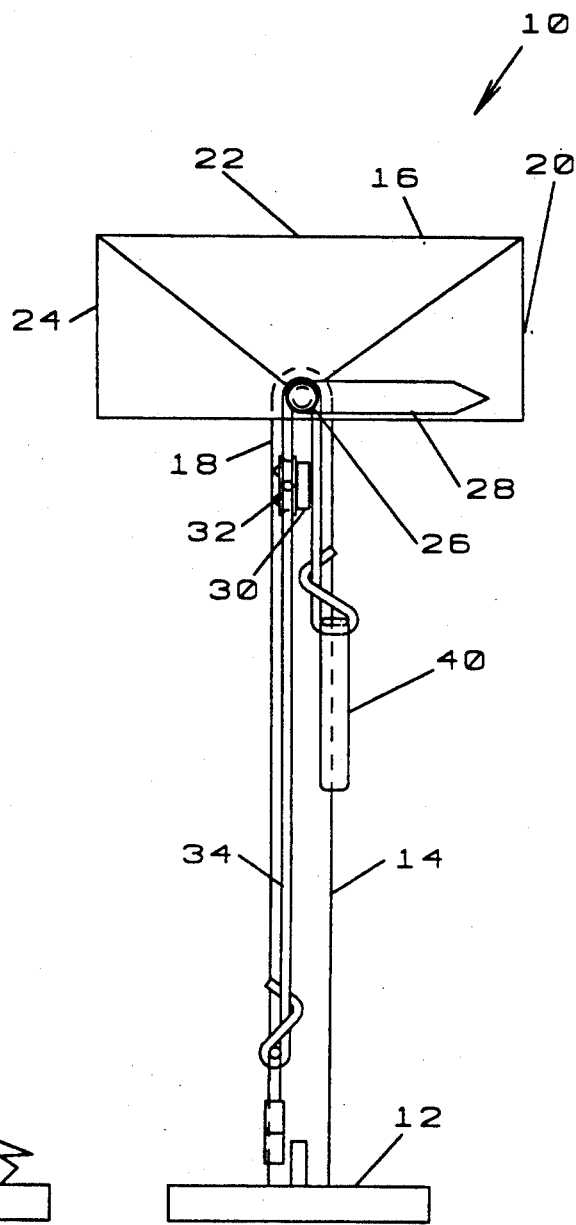
FIG. 1 is a front view of a parking guide embodying the present invention.

In that form of the present invention chosen for purposes of illustration in the drawing, FIG. 1 shows a parking guide, indicated generally at 10, comprising a free-standing portable base 12 for supporting the parking guide 10 on a surface, not shown, such as a garage floor. A support member 14 is mounted on the base 12 and projects substantially vertically upward from the base 12 to a point located approximately at the eye level of a vehicle driver. A position display board 16 is mounted on the upper end 18 of the support member 14 and extends substantially perpendicular to a level which will be clearly visible by a person driving a vehicle toward the parking guide 10. The position display board 16 is preferably marked in a plurality of zones, as seen at 20, 22 and 24, indicating respective zones of closeness to the parking guide 10. If desired, the zones 20, 22 and 24 may be appropriately colored or may carry suitable indicia to indicate the position of the front end of the vehicle to the driver. A pulley 26 is rotatably mounted on the support member 14 adjacent the lower edge of the position display board 16 and carries an indicator arm 28 which extends at least partially across the face of the position indicator board 16. A spacer arm 30 is mounted on the support member 14 below the pulley 26 and projects forwardly a desired distance from the support member 14 and carriers a plurality of pulleys 32 which serve to guide the movement of an actuating cord 34. The actuating cord 34 is secured to the base 12, extends substantially vertically upward to pass about the pulley 32 at the outer end 36 of the spacer arm 30 and passes inwardly about pulley 32 at the inner end 38 of the spacer arm 30, then passes upward about pulley 26, in driving relation with the pulley 26, and finally passes downward to a pendulous weight 40.

In use, the parking guide 10 is positioned in a desired parking location and is situated so that the rear edge of the base 12 of the parking guide 10 is located substantially at the position where the front bumper of a vehicle is to be positioned when the vehicle is parked with the longitudinal axis of the base 12 extending along the approach path by which the vehicle to be parked will travel and with the position display board 16 extending substantially perpendicular to the approach path to afford the driver of the vehicle an optimum view of the position display board 16. Since the base 12 is free-standing and portable, it may be positioned substantially as desired immediately adjacent a garage wall or spaced a desired distance from the wall to provide a walkway or storage space between the forward end of the parking area and the garage wall. As the vehicle is driven into the desired parking location, the front end of the vehicle will encounter the vertical portion of the actuating cord 34, between the base 12 and the outer end 36 of the spacer arm 30 and will displace the actuating cord 34 toward the support member 14. This causes the actuating cord 34 to move about the pulley 26, rotating the pulley 26 and causing the indicator arm 28 to move across the face of the position display board 16. As the front end of the vehicle moves closer to the support member 14, the indicator arm 28 will move progressively across the face of the position display board 16, passing from zone 20 to zone 22 and, finally to zone 24. As indicated above, the zones 20, 22 and 24 may be appropriately colored or may carry suitable indicia to indicate the position of the front end of the vehicle to the driver. Thus, for example, zone 20 may be painted green, zone 22 may be painted yellow and zone 24 may be painted red. Since these colors correspond to the standard "GO", "CAUTION" and "STOP" lights of traffic signals, the driver will recognize that movement of the indicator arm 28 in zone 20 indicates that the front end of the vehicle has engaged the actuator cord 34 and is approaching the support member 14. Movement of the indicator arm 28 into zone 22 will warn the driver to prepare to stop the vehicle and movement of the indicator arm 28 into zone 24 will advise the driver that the front end of the vehicle is within the desired parking range and the vehicle should be stopped immediately! The dimensions of the parking range can be varied, if desired, by varying the position of attachment of the actuating cord 34 to the base 12, the length of the spacer arm 30 and the diameter of the pulley 26.

Obviously, numerous variations and modifications can be made without departing from the spirit of the present invention. Therefore, it should be clearly understood that the form of the present invention described above and shown in the figures of the accompanying drawing are illustrative only and are not intended to limit the scope of the present invention.

What is claimed is:

1. A vehicle parking quidel comprising:

a base, a support member projecting vertically upward from said base, a position display board mounted on said support member in a position clearly visible by the driver of a vehicle to be parked and carrying indicating means positionable to advise the driver when the vehicle is in a desired parking range, and means engageable by a vehicle approaching said parking guide to move said indicating means in an manner proportional to the distance of said vehicle from the desired parking position.

2. The device of claim 1 wherein:
   said base is free-standing.

3. The device of claim 1 wherein:
   said base is portable.

4. The device of claim 1 wherein:
   said engageable means is spaced a predetermined distance forwardly of said support member.

5. The device of claim 1 wherein:
   said engageable means comprises:

a spacer arm mounted on said support member adjacent said position display board and projecting forwardly from the support member, and an actuating cord secured to the base and extending upward to the outer end of said spacer arm, and indicator means movable by said actuating cord and cooperating with said position display board to indicate the position of an approaching vehicle to the driver of said vehicle.

6. The device of claim 5 wherein:
   said actuator cord extends substantially vertically upward from said base to said outer end of said spacer arm.

7. The device of claim 1 wherein:
   said means engageable by a vehicle serves to move said indicating means in a manner to indicate the gradual approach of said vehicle to said parking guide.

8. A parking guide comprising:

a free-standing, portable base, a support member projecting vertically upward from said base, a position display board mounted adjacent the upper end of said support member, a pulley mounted on said support member adjacent said position display board and carrying an indicator arm moveable across at least a portion of said position display board, a spacer arm mounted on the support member adjacent said position display board and projecting forwardly from said support member, and an actuating cord secured to said base and extending upward to the outer end of said spacer arm and inward about said pulley in driving relation with said pulley.

9. The device of claim 8 wherein:

said actuating cord serves to move said indicator arm across said position display board in a manner directly related to the distance of a vehicle from said support member.

10. A vehicle parking guide comprising:
a base,
a support member projecting vertically upward from said base,
a position display board mounted on said support member in a position clearly visible by the driver of a vehicle to be parked and carrying indicating means positionable to advise the driver when the vehicle is in a desired parking range, and
means engageable by a vehicle approaching said parking guide to move said indicating means,
a pulley rotatably mounted adjacent the lower edge of said position display board, and
an indicator arm carried by said pulley and extending across at least a portion of said position display board.

11. The device of claim 10 wherein:
said base is free-standing.

12. The device of claim 10 wherein:
said base is portable.

13. The device of claim 10 wherein:
said engageable means is spaced a predetermined distance forwardly of said support member.

14. The device of claim 10 wherein:
said engageable means comprises:
a spacer arm mounted on said support member adjacent said position display board and projecting forwardly from the support member, and
an actuating cord secured to the base and extending upward to the outer end of said spacer arm, and
indicator means movable by said actuating cord and cooperating with said position display board to indicate the position of an approaching vehicle to the driver of said vehicle.

15. The device of claim 10 wherein:
said actuator cord extends substantially vertically upward from said base to said outer end of said spacer arm.

* * * * *